United States Patent
Edagawa et al.

(10) Patent No.: US 6,728,437 B2
(45) Date of Patent: Apr. 27, 2004

(54) PUMPING LIGHT GENERATOR AND FIBER RAMAN AMPLIFIER

(75) Inventors: Noboru Edagawa, Kamifukuoka (JP); Masatoshi Suzuki, Kamifukuoka (JP)

(73) Assignee: KDD Submarine Cable Systems Inc., Tokyo (JP)

(*) Notice: Subject to any disclaimer, the term of this patent is extended or adjusted under 35 U.S.C. 154(b) by 0 days.

(21) Appl. No.: 09/882,352

(22) Filed: Jun. 15, 2001

(65) Prior Publication Data

US 2001/0053264 A1 Dec. 20, 2001

(30) Foreign Application Priority Data

Jun. 16, 2000 (JP) ........................................ 2000-182164

(51) Int. Cl.[7] .............................. G02B 6/26; G02B 6/42
(52) U.S. Cl. ............................. 385/27; 385/11; 385/31; 359/341.3; 359/345; 372/19; 372/69; 372/70; 372/71; 372/108
(58) Field of Search ................................ 385/11, 15, 24, 385/27, 28, 31, 33, 36, 39; 359/341.3, 345, 334, 639; 372/19, 106, 69–71, 108, 6

(56) References Cited

U.S. PATENT DOCUMENTS

| | | | | |
|---|---|---|---|---|
| 4,572,608 | A | | 2/1986 | Mochizuki et al. ...... 350/96.15 |
| 4,720,162 | A | * | 1/1988 | Mochizuki et al. .......... 385/16 |
| 4,761,050 | A | * | 8/1988 | Byron .......................... 385/16 |
| 4,784,450 | A | * | 11/1988 | Jain et al. .................... 359/332 |
| 4,805,977 | A | | 2/1989 | Tamura et al. ........... 350/96.16 |
| 5,367,587 | A | * | 11/1994 | Mizuochi et al. ............. 385/27 |
| 5,539,566 | A | * | 7/1996 | Terahara et al. ............ 359/179 |
| 5,600,738 | A | * | 2/1997 | Bergland et al. ............... 385/11 |
| 5,692,082 | A | | 11/1997 | Fukushima .................... 385/86 |
| 5,740,288 | A | * | 4/1998 | Pan .............................. 385/11 |
| 6,421,480 | B2 | * | 7/2002 | Cao ............................... 385/24 |
| 6,522,796 | B1 | * | 2/2003 | Ziari et al. ..................... 385/11 |
| 6,546,165 | B2 | * | 4/2003 | Yoon et al. .................... 385/24 |
| 2002/0141698 | A1 | * | 10/2002 | Matsushita et al. ........... 385/31 |

FOREIGN PATENT DOCUMENTS

| | | | | |
|---|---|---|---|---|
| DE | 3626714 A | * | 2/1987 | ............ G01C/19/58 |
| EP | 0 734 105 A2 | | 9/1999 | ............ H01S/3/06 |
| EP | 1 229 673 A2 | | 8/2002 | ............ H04B/10/17 |
| JP | 57-190922 | | 11/1982 | ............ G02B/27/08 |
| JP | 05119360 A | * | 5/1993 | ............ G02F/1/35 |

OTHER PUBLICATIONS

W. K. Burns, "Degree of Polarization in the Lyot Depolarization," Journal of Lightwave Technology, vol. LT–1, No. 3, pp. 475–479, Sep. 1983.
K. Mochizuki, "Degree of polarization in jointed fibers: the Lyot depolarizer," Applied Optics. vol. 23. No. 19, pp. 3284–3288, Oct. 1, 1984.
Y. Emori, et al., "Cost–effective depolarized diode pump unit designed for C–band flat–gain Raman amplifiers to control EDFA gain profile," Technical Digest, OFC2000, paper FF4, 2000.
European Search Report dated Nov. 26, 2002 for corresponding European patent application.

* cited by examiner

*Primary Examiner*—Brian Healy
*Assistant Examiner*—Daniel Petkovsek
(74) *Attorney, Agent, or Firm*—Christie, Parker & Hale, LLP

(57) ABSTRACT

An object of the present invention is to prevent an increase of the degree of polarization of an output pumping light even if one of pumping light sources has a failure. Laser diodes (30a, 30b) are composed of FP-LDs made of InGaAsP to laser-oscillate at 1480 nm band. The outputs from the laser diodes (30a, 30b) enter a polarizing beam splitter (32) in orthogonal state of polarization and are combined there. The combined light by the polarizing beam splitter (32) enters a depolarizing element (34) and is depolarized there.

13 Claims, 4 Drawing Sheets

US 6,728,437 B2

PUMPING LIGHT GENERATOR AND FIBER RAMAN AMPLIFIER

CROSS-REFERENCE TO RELATED APPLICATION

This application claims priority of Japanese patent Application No. 2000-182164, filed on Jun. 16, 2000.

FIELD OF THE INVENTION

This invention relates to a pumping light generator and fiber Raman amplifier, and more specifically to an apparatus to generate a pumping light for optical amplification and a fiber Raman amplifier to use the pumping light generator.

BACKGROUND OF THE INVENTION

Recently, fiber Raman amplifiers have received much attention as important optical amplification technology to solve a lack of amplification bands in future ultra large capacity optical transmission systems because it is capable of using any wavelength band as an amplification band by choosing an appropriate pumping light wavelength.

In the fiber Raman amplification, in principle, gain becomes the maximum when the state of polarization of the pumping light agrees with that of the signal light and the gain becomes zero when the state of polarization of the pumping light is orthogonal to that of the signal light. Therefore, in order to obtain a constant gain regardless of the state of polarization of the signal light, it is necessary to depolarize the pumping light.

To depolarize the pumping light, such a configuration as shown in FIG. 4 is well known (U.S. Pat. No. 4,805,977). Two laser diodes (pumping light sources) 10 and 12 output pumping lights of constant polarization, having no or small interrelation each other. A polarizing beam splitter 14 combines the output lights from the laser diodes 10 and 12 at almost equal optical power and in orthogonal state of polarization.

In addition, a method to depolarize the light with a birefringence medium or Lyot depolarizer is also widely known (See U.S. Pat. No. 4,572,608, Japanese Laid-Open Patent Publication No. 57-190922, William K burns, "Degree of Polarization in the Lyot Depolarizer", Journal of Lightwave Technology, Vol. LT-1, No. 3, pp. 475–479, Sept. 1983, and Kiyofumi Mochizukim, "Degree of polarization in jointed fibers: the Lyot depolarizer", Applied Optics, Vol. 23, No. 19, pp. 3284–3288, Oct. 1, 1984).

Furthermore, the use of wavelength-division-multiplexed depolarized pump light has been proposed for depolarized pump light source with some source redundancy (Y. Emori, S. Matsushita, and S. Namiki, "Cost-effective depolarized diode pump unit designed for C-band flat-gain Raman amplifiers to control EDFA gain profile", Technical Digest, OFC2000, paper FF4, 2000). FIG. 5 shows a schematic block diagram of such a pumping light generator.

In FIG. 5, a laser diode (a pumping light source) 20a outputs a completely polarized light (or a highly polarized light) having a wavelength of 1428 nm, and a laser diode (a pumping light source) 20b outputs a completely polarized light (or a highly polarized light) having a wavelength of 1455 nm. The lights output from the laser diodes 20a and 20b are depolarized by passing through high birefringent optical fibers (or polarization holding fibers) 22a and 22b respectively and combined by a combiner 24. The light output from the combiner 24 contains the lights of the wavelengths 1428 nm and 1455 nm and are being depolarized or weakly-polarized.

In the conventional configuration shown in FIG. 4, the depolarized pumping light sources of high-output are realized because it is possible to combine two pumping lights of the same wavelength band at low-loss. However, if one of the pumping light sources has failure, the output light becomes a completely polarized light causing a fiber Raman amplifier to have severe polarization dependency.

In the conventional configuration shown in FIG. 5, since a pumping light of each wavelength is separately depolarized, the degree of polarization of the light output from the combiner 24 will never changes even if any one of pumping light sources has failure. However, in this configuration, since polarization combination to combine pumping lights at low-loss cannot be used, it is difficult to increase pumping light power in the same wavelength band. In addition, if any one of the pumping light sources of the respective wavelength has failure, gain wavelength characteristics (gain shape) of the fiber Raman amplifier are severely changed since this particular pumping wavelength component is absent.

SUMMARY OF THE INVENTION

It is therefore an object of the present invention to provide a pumping light generator which solves the above-described problems.

Another object of the present invention is to provide a pumping light generator in which output power is easily increased.

A further object of the present invention is to provide a pumping light generator which can be realized with fewer elements and outputs a pumping light of high intensity in a depolarized or weakly-polarized state.

Still a further object of the present invention is to provide a pumping light generator in which output light is kept in a depolarized or weakly-polarized state even if one of pumping light sources has failure.

A pumping light generator according to the invention is composed of two pumping light sources, a combiner to combine the pumping light outputs from the two pumping light sources in orthogonal state of polarization, and a degree-of-polarization reducer to reduce the degree of polarization of the light from the polarizing combiner.

With this configuration, a single degree-of-polarization reducer can reduce each degree of polarization of the two pumping lights combined in orthogonal state of polarization simultaneously. Accordingly, if one of the pumping light sources has a failure, the degree of polarization of the pumping light output from the generator does not increase and thus it is possible to maintain high reliability.

Also, the pumping light generator according to the invention is composed of a plurality of pumping light sources, a combiner to combine lights output from the plurality of pumping light sources, and a degree-of-polarization reducer to reduce the degree of polarization of the light output from the combiner.

This configuration makes it possible that a single degree-of-polarization reducer can reduce the degree of polarizations of the plurality of pumping lights collectively. Accordingly, a simple, compact, and economical pumping light generator can be realized.

Preferably, the degree-of-polarization reducer contains a depolarizing element to depolarize the light output from the combiner.

The degree-of-polarization reducer consists of, for example, a birefringent medium. The birefringent medium is disposed so that it outputs each input pumping light from each polarization axis of the birefringent medium at practically equal optical power to the others. The birefringent medium has polarization dispersion longer than a coherent length of the output light from each pumping light source. The birefringent medium contains for example rutile crystal or $YVO_4$.

The degree-of-polarization reducer is composed of the first and the second birefringent mediums in which each polarization dispersion is longer than a coherence length of the output light from each pumping light source, one polarization dispersion differs more than twice as much as the other one, and the second birefringent medium is arranged behind the first birefringent medium so that the light passed through one polarization axis of the first birefringent medium is output from two polarization axes of the second birefringent medium at almost equivalent optical power. By using this configuration, it is also possible to utilize a polarization non-maintaining type combiner.

A fiber Raman amplifier according to the invention is composed of the above-mentioned pumping light generator, an optical fiber to transmit a signal light, and an optical coupler to couple an output light from the pumping light generator with the optical fiber.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
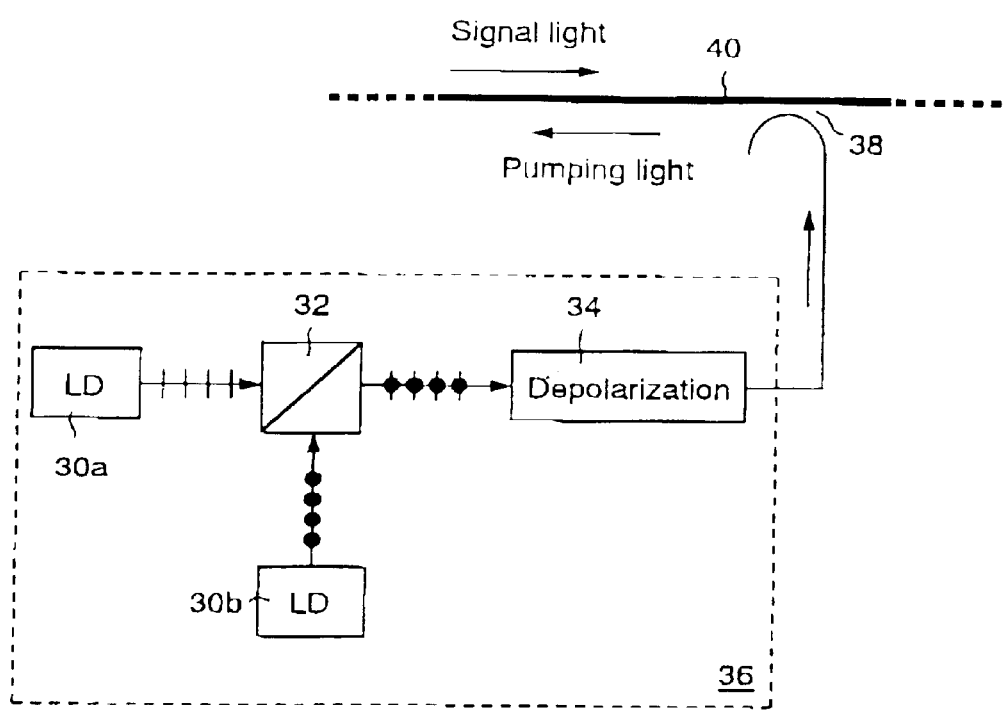
FIG. 1 shows a schematic block diagram of the first embodiment according to the invention.

FIG. 1 shows a schematic block diagram of the first embodiment according to the invention. Reference numerals 30a and 30b denote laser diodes (pumping light sources) to generate the laser light having a high degree of polarization, more specifically, Fabry-Perot laser diodes (FP-LD) made of InGaAsP which oscillate at 1480 nm band. The outputs from the laser diodes 30a and 30b enter a polarizing beam splitter 32 in orthogonal state of polarization with each other and are combined together there. The outputs from the laser diodes 30a and 30b are combined at low-loss because of this polarization combination. Oscillation wavelength bands of the laser diodes 30a and 30b can be practically the same or different. The light combined by the polarizing beam splitter 32 enters a depolarizing element 34 and is depolarized there. The laser diodes 30a and 30b, the polarizing beam splitter 32 and the depolarizing element 34 form a pumping light generator 36 of this embodiment.

The depolarizing element 34 is composed of, for example, birefringent crystal such as rutile crystal, and it is disposed so that its birefringent axis meets each polarization axis of the polarizing beam splitter 32 at an angle of 45°. With this configuration, optical powers output from the respective polarization axes are almost unified and accordingly the output light from the rutile crystal becomes depolarized light. If transmission loss of the rutile crystal differs in each birefringent axis, the disposition angle for the polarization bean splitter 32 should be adjusted so that the optical powers output from the respective birefringent axes become equivalent. The laser diodes 30a and 30b are generally multi-mode oscillating, and their light source spectrum widths are approximately as wide as 10 nm. This means that the coherence time is about 1 ps. When the rutile crystal is longer than 1 mm, the polarization dispersion can be obtained approximately more than 1 ps and thus it is practically possible to realize depolarization.

The light from the pumping light generator 36, namely the output light from the depolarizing element 34 enters an optical coupler 38. The optical coupler 38 introduces the pumping light output from the pumping light generator 36 into an optical fiber transmission line 40 in the opposite direction from the propagation direction of the signal light, for example. On the optical fiber transmission line 40, the pumping light from the pumping light generator 36 causes Raman amplification and the signal light is amplified.

In the embodiment shown in FIG. 1, since the output lights from the two laser light sources are depolarized simultaneously by one depolarizing element after polarization combination, even if one of the laser light sources has a failure, the degree of polarization of the output light from the generator 36 will not increase. Accordingly, a pumping light generator with robustness against failure is realized. The output powers from the laser diodes 30a and 30b can be used effectively because it is possible to utilize the polarization combination.

Figure 2:
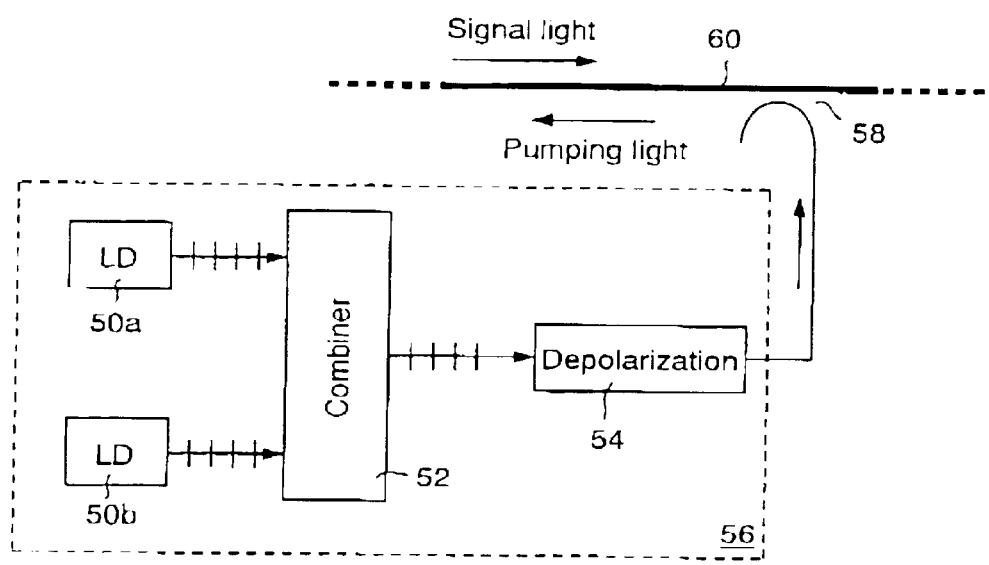
FIG. 2 shows a schematic block diagram of the second embodiment according to the invention.

FIG. 2 shows a schematic block diagram of the second embodiment according to invention. Reference numerals 50a and 50b denote laser diodes (pumping light sources) to generate a laser light having a high degree of polarization. The laser diodes 50a and 50b are, more specifically, composed of laser diodes made of InGaAsP which oscillation wavelength is stabilized to 1460 nm and 1480 nm by such as an outside fiber grating respectively. Output lights from the laser diodes 50a and 50b enter a polarization maintaining type combiner 52. The combiner 52 combines the output lights from the laser diodes 50a and 50b in maintaining both state of polarizations of the output lights and applies the combined light to a depolarizing element 54. The output light from the combiner 52, namely the input light of the depolarizing element 54 is being polarized in two directions according to the original output lights of the laser diodes 50a and 50b, and the depolarizing element 54 depolarizes those component lights together. The laser diodes 50a and 50b, the combiner 52 and the depolarizing element 54 form a pumping light generator 56 of this embodiment.

The depolarizing element 54 is composed of, similarly to the depolarizing element 34, birefringent crystal such as rutile crystal, for example. Since laser oscillating spectrum widths of the laser diodes 50a and 50b are as narrow as approximately 1 nm, the coherence time is about 10 ps. Accordingly, when the rutile crystal used for the depolarizing element 54 is about 10 mm long, the polarization dispersion is about 10 ps and thus it is practically possible to realize depolarization.

The output light from the pumping light generator 56, namely the output light from the depolarizing element 54, enters a optical coupler 58. The optical coupler 58 introduces the pumping light output from the pumping light generator 56 into an optical fiber transmission line 60 in the opposite direction from a propagation direction of the signal light, for example. On the optical fiber transmission line 60, the pumping light from the pumping light generator 56 causes Raman amplification, and the signal light is amplified.

In the embodiment shown in FIG. 2, the polarization maintaining type combiner 52 combines output lights from the plurality of pumping light sources, the single depolarizing element 52 depolarizes the combined lights collectively, and therefore a pumping light generator of simple and small configuration is realized with low cost.

Figure 3:
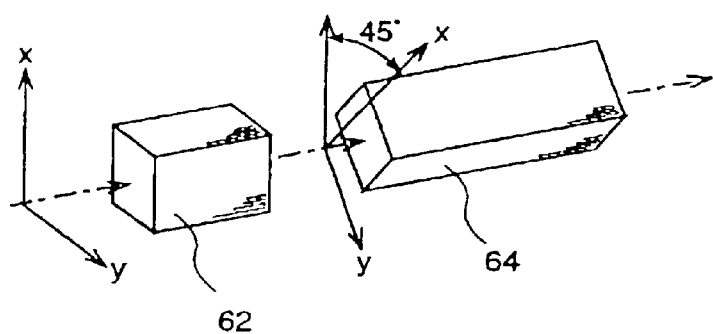
FIG. 3 shows another configuration of a depolarizing element.
Figure 4:
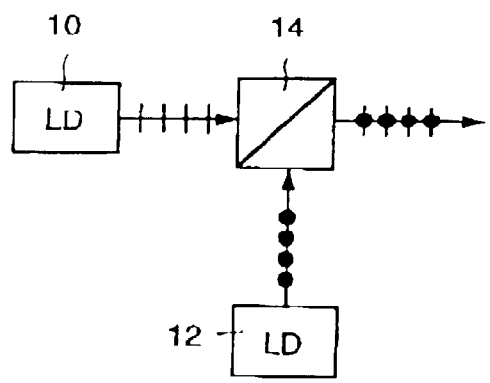
FIG. 4 shows a schematic block diagram of a conventional polarization combining type pumping light generator.
Figure 5:
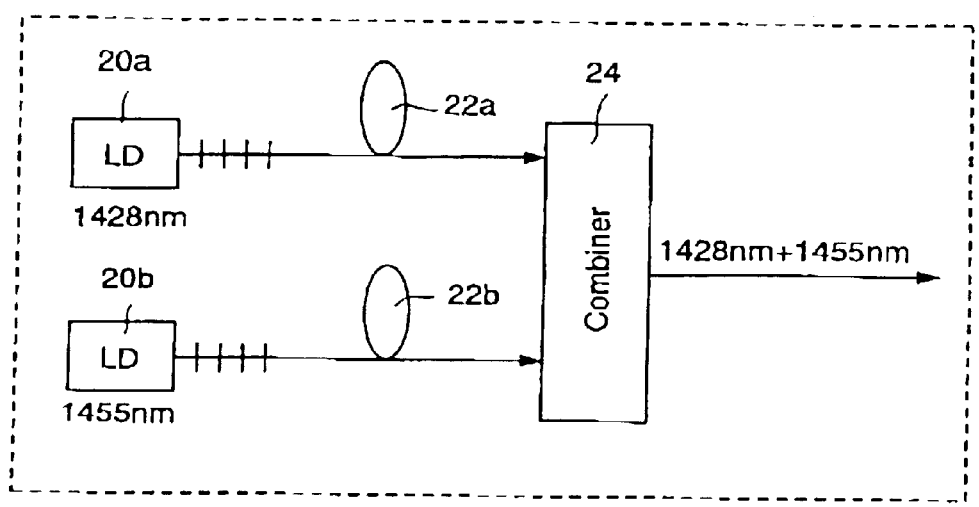
FIG. 5 shows a schematic block diagram of another conventional art.

In the embodiment shown in FIG. 2, the polarization maintaining type combiner 52 is used. However, a combiner which cannot maintain polarization is also applicable. If such a combiner is utilized, the depolarizing element 54 should be prepared as follows. That is, as shown in FIG. 3, birefringent mediums 62, 64 are connected in serial which polarization dispersions are longer than the coherence lengths of the output lights from the laser diodes 50a, 50b and in which one polarization dispersion differs more than twice as much as the other one. The two birefringent mediums 62 and 64 should be disposed so that the light passed through one polarization axis of the first located birefringent medium 62 is output from two polarization axes of the latter birefringent medium 64 at almost identical optical powers. When transmission loss of the rutile crystal is uniform at every birefringent axis, 10 mm rutile crystal and 20 mm rutile crystal should be disposed so that each birefringent axis is inclined at 45°.

Birefringent mediums to be used as the depolarizing elements 34 and 54 are high birefringent optical fiber such as a PANDA fiber (a trademark) and YVO$_4$ besides the rutile crystal.

It is also applicable to combine the embodiments in FIGS. 1 and 2. For example, it is possible to use the light source to combine output lights from a plurality of pumping light sources at the same wavelength band in the orthogonal state of polarization and output them instead of the laser diode 50a. The laser diode 50b is also in the same situation.

In the above description, the depolarizing elements 34 and 54 are explained as depolarizing the input light, it is also possible that they only reduce the degree of polarization of the input light. The more the degree of polarization is reduced, the more the optical amplification characteristics is stabilized.

As readily understandable from the aforementioned explanation, according to the invention, since a plurality of pumping lights are combined first and depolarized or weakly-polarized all at once, depolarized state of the pumping lights can be maintained even if one of the pumping light sources has failure. By using this configuration, an optical amplifier, e.g. a fiber Raman amplifier, which is highly reliable, economical and highly efficient is realized. In addition, it is possible to obtain depolarized or weakly-polarized combination pumping lights from a plurality of pumping lights having a different wavelength using a simple configuration. Therefore, this invention can largely contribute to increase channel capacity in optical fiber communication networks.

While the invention has been described with reference to the specific embodiment, it will be apparent to those skilled in the art that various changes and modifications can be made to the specific embodiment without departing from the spirit and scope of the invention as defined in the claims.

We claim:

1. A pumping light generator comprising:

two pumping light sources;

a combiner to combine pumping lights output from the two pumping light sources in orthogonal state of polarization; and a degree-of-polarization reducer comprising a birefringent medium to reduce the degree of polarization of the light output from the combiner, wherein the birefringent medium is disposed so as to output each input pumping light from each polarization axis of the birefringent medium at practically equal optical power to the other.

2. A pumping light generator comprising:

two pumping light sources;

a combiner to combine pumping lights output from the two pumping light sources in orthogonal state of polarization; and a degree-of-polarization reducer comprising a birefringent medium to reduce the degree of polarization of the light output from the combiner, wherein the birefringent medium comprises polarization dispersion longer than a coherence length of the output light from each pumping light source.

3. A pumping light generator comprising:

a plurality of pumping light sources;

a combiner to combine output lights from the plurality of pumping light sources; and a degree-of-polarization reducer comprising a birefringent medium to reduce the degree of polarization of the light output from the combiner wherein the birefringent medium is disposed so as to output each input pumping light from each polarization axis of the birefringent medium at practically equal optical power to the others.

4. A pumping light generator comprising:

a plurality of pumping light sources;

a combiner to combine output lights from the plurality o: pumping light sources; and a degree-of-polarization reducer comprising a birefringent medium to reduce the degree of polarization of the light output from the combiner, wherein the birefringent medium comprises polarization dispersion longer than a coherence length of the light output from each pumping light source.

5. The pumping light generator of claim 3 wherein the birefringent medium comprises either one of rutile crystal and YVO4.

6. A pumping light generator comprising:

a plurality of pumping light sources;

a combiner to combine output lights from the plurality of pumping light sources; and a degree-of-polarization reducer to reduce the degree of polarization of the light output from the combiner, wherein the degree-of-polarization reducer comprises first and second birefringent mediums in which each polarization dispersion is longer than a coherence length of the output light from each pumping light, one polarization dispersion differs twice as much as the other one, and the second birefringent medium is arranged behind the first birefringent medium so that the light passed through the first birefringent medium is output from two polarization axes of the second birefringent medium at almost the equivalent optical power.

7. A pumping light generator comprising:

a first pumping light source that produces a first pumping light;

a second pumping light source that produces a second pumping light; a polarizing beam combiner to combine the first pumping light and the second pumping light in an orthogonal state of polarization; and a degree-of-polarization reducer comprising a birefringent medium to reduce the degree of polarization of light output from the polarizing beam combiner wherein the birefringent medium is disposed so as to cause optical power of the first pumping light to equal optical power of the second pumping light at the output of the birefringent medium.

8. A pumping light generator comprising:

a first pumping light source that produces a first pumping light;

a second pumping light source that produces a second pumping light;

a polarizing beam combiner to combine the first pumping light and the second pumping light in an orthogonal state of polarization; and a degree-of-polarization reducer comprising a birefringent medium to reduce the degree of polarization of light output from the polarizing beam combiner, wherein the birefringent medium comprises polarization dispersion longer than a coherence length of either the first pumping light or the second pumping light.

9. The pumping light generator of claim 7 wherein the birefringent medium is selected from the group consisting of rutile crystal and YVO4.

10. A pumping light generator comprising:

a plurality of pumping light sources that produce a plurality of pumping lights;

a combiner to combine the pumping lights and produce a light output; and a degree-of-polarization reducer comprising a birefringent medium to reduce a degree of polarization of the light output from the combiner, wherein the birefringent medium is disposed so as to cause optical power of each pumping light which is output from the birefringent medium to be essentially equal in optical power.

11. A pumping light generator comprising:

a plurality of pumping light sources that produce a plurality of pumping lights;

a combiner to combine the pumping lights and produce a light output; and a degree-of-polarization reducer comprising a birefringent medium to reduce a degree of polarization of the light output from the combiner, wherein the birefringent medium comprises polarization dispersion longer than a coherence length of any of the pumping lights.

12. The pumping light generator of claim 10 wherein the birefringent medium is selected from the group consisting of rutile crystal and YVO4.

13. A pumping light generator comprising:

a plurality of pumping light sources that produce a plurality of pumping lights;

a combiner to combine the pumping lights and produce a light output; and a degree-of-polarization reducer to reduce a degree of polarization of the light output from the combiner, wherein the degree-of-polarization reducer comprises first and second birefringent mediums each having a polarization dispersion length longer than a coherence length of any of the pumping lights, one of the polarization dispersion lengths being twice as much as the other one, and the second birefringent medium is arranged to receive light passed through the first birefringent medium, and further arranged so that the input to the two polarization axes of the second birefringent medium contribute essentially equivalent optical power to light output from the second birefringent medium.

* * * * *